(12) United States Patent
Shibuta

(10) Patent No.: US 6,795,628 B2
(45) Date of Patent: Sep. 21, 2004

(54) BROADBAND OPTICAL FIBER

(75) Inventor: Taeko Shibuta, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 79 days.

(21) Appl. No.: 10/295,873

(22) Filed: Nov. 18, 2002

(65) Prior Publication Data
US 2003/0118304 A1 Jun. 26, 2003

(30) Foreign Application Priority Data
Nov. 19, 2001 (JP) .......................... 2001-353329

(51) Int. Cl.[7] .............................................. G02B 6/16
(52) U.S. Cl. .................... 385/123; 385/100; 385/115
(58) Field of Search ................................. 385/123, 124, 385/125, 126, 127, 128

(56) References Cited

U.S. PATENT DOCUMENTS

| | | | | |
|---|---|---|---|---|
| 5,613,027 A | * | 3/1997 | Bhagavatula | 385/123 |
| 5,878,182 A | * | 3/1999 | Peckham | 385/123 |
| 5,956,448 A | * | 9/1999 | Smolka et al. | 385/124 |
| 6,687,441 B1 | * | 2/2004 | Li | 385/123 |

* cited by examiner

Primary Examiner—Phan T. H. Palmer
Assistant Examiner—Jennifer Doan
(74) Attorney, Agent, or Firm—Eric J. Robinson; Robinson Intellectual Property Law Office, P.C.

(57) ABSTRACT

Provided is an optical fiber that is in particular suitable for Raman amplification. An effective area at a wavelength of 1570 nm is in a range of 35 $\mu m^2$ to 45 $\mu m^2$, an absolute value of a dispersion slope at the wavelength is equal to or less than 0.04 ps/nm$^2$/km, and a dispersion value at the wavelength is in a range of 5 ps/nm/km to 10 ps/nm/km. It is desirable that a refractive index profile contains at least one annular region between a center core and a cladding region.

20 Claims, 2 Drawing Sheets

BROADBAND OPTICAL FIBER

FIELD OF THE INVENTION

The present invention relates to an optical fiber that is suitably used for wavelength division multiplexing (WDM) optical transmission system.

RELATED ART

An optical fiber with a primary silica content and a germanium-doped core is in widespread use. For increasing the transmission capacity of optical fiber in action, a technique of performing WDM optical transmission is actively studied. In recent years, an optical transmission system using Raman amplification is also studied.

As to the Raman amplification, it is known that the maximum value of a Raman gain is obtained some 100 nm on the longer wavelength side with reference to a pumping light source wavelength. By utilizing this phenomenon, an attempt has been made to amplify WDM signal light with a plurality of pumping light sources having different wavelengths (hereinafter referred to as the "wavelength multiplexed pumping light source").

Here, in order to prevent the pumping light on the longest wavelength side of the wavelength multiplexed pumping light source overlapping signal light of a WDM signal on the shortest wavelength side, it is required that the wavelength band of the wavelength multiplexed pumping light source is equal to or less than 100 nm.

For example, when signal light in a wavelength band of 1530 nm to 1565 nm (generally called the "C-Band") and signal light in a wavelength band of 1565 nm to 1625 nm (generally called the "L-Band") are simultaneously amplified, the maximum wavelength band of the wavelength multiplexed pumping light source becomes around 95 nm in a range of around 1430 nm to 1525 nm. Consequently, it is possible to perform Raman amplification simultaneously at C-Band and L-Band.

Also, in order to realize an optical transmission system using the Raman amplification, it is required that no unrecoverable waveform distortion occurs at a repeater and a receiving station (terminal). To this end, it is required to suppress a nonlinear phenomenon in an optical transmission line and to reduce cumulative dispersion in the optical transmission line.

Meanwhile, as to an optical transmission line used in an optical transmission system using the Raman amplification, active studies are being made on the use of a conventional single-mode optical fiber (SMF) having zero dispersion at a wavelength of around 1.3 $\mu$m, an optical fiber with high refractive index of its core (such as an optical fiber (NZDSF) having small dispersion at a wavelength of around 1.55 $\mu$m), and the like.

However, the effective area ($A_{eff}$) of the SMF is around 80 $\mu m^2$, relatively large; and its Raman amplification efficiency is low. Therefore, 1W or higher total optical power of the wavelength multiplexed pumping light source is required to provide Raman amplification. Consequently, there is a problem that this optical fiber is uneconomical.

Also, the NZDSF intrinsically has large Rayleigh scattering in comparison with the SMF described above because the refractive index of its core is high and the relative refractive index difference between the core and a cladding region is set to around 1% or the like. If an optical fiber like this having a high Rayleigh scattering coefficient is used for the Raman amplification, so-called double Rayleigh scattering tends to occur: a noise component scattered rearward is next scattered frontward and overlaps a signal. Also, the signal-to-noise characteristic (SNR) tends to be deteriorated.

Also, in order to avoid a four wave mixing (FWM) problem, the NZDSF is designed to disallow the zero-dispersion wavelength exist in a signal band or a pumping light band. However, the occurrence of another nonlinear phenomenon due to the input of high-power light becomes a problem. In many cases, a dense WDM (DWDM) transmission system is applied to a long-distance trunk system and an extremely high transmission speed is generally used in such cases. Consequently, it is required to suppress a bit error rate (BER) to an extremely low level, so that if there exists the nonlinear phenomenon problem described above, it becomes difficult to apply the NZDSF to the Raman amplification in the DWMD transmission system.

Also, as an optical fiber that is applicable to the optical transmission system using the Raman amplification, there may also be conceived a dispersion-flattened optical fiber (DFF) of which dispersion in the wavelength band of signal light takes almost a constant value.

A tangible example of the DFF is an optical fiber disclosed in Japanese Laid-Open Gazette JP 11-84159 A. This optical fiber is characterized in that the mode field diameter at a wavelength of 1550 nm is roughly equal to or more than 8.6 $\mu$m (if converted into $A_{eff}$, this value becomes around 60 $\mu m^2$ or higher).

However, the efficiency of the optical fiber disclosed in JP 11-84159 A is still low from the viewpoint of providing the Raman amplification, although the efficiency is not so low when compared with the SMF described above. Therefore, it is impossible to significantly reduce the total power of the wavelength multiplexed pumping light source, so that the uneconomical problem still remains.

Additionally, an optical fiber of a type, differing from the NZDSF, DFF, and the like described above, is usable in a wide wavelength band, is disclosed in Japanese Laid-Open Gazette JP 2000-221352, for instance.

However, the optical fiber disclosed in JP 2000-221352 A is mainly designed to transmit signal light in both of 1.3 $\mu$m and 1.55 $\mu$m wavelength bands and its zero-dispersion wavelength exists in a range of 1.37 $\mu$m to 1.50 $\mu$m (all of the zero-dispersion wavelengths illustrated in the specific example exist on the longer wavelength side than 1.41 $\mu$m). As a result, there can be occurred four wave mixing (FWM) due to the existence of the zero-dispersion wavelength in the pumping light band or in the proximity thereof like in the case of the NZDSF described above.

That is, each optical fiber described above is not suitable for providing an optical transmission system with the Raman amplification.

SUMMARY OF THE INVENTION

The present invention has an object to provide an optical fiber particularly suitable for the Raman amplification.

An optical fiber in the present invention is characterized in that an effective area at a wavelength of 1570 nm is in a range of 35 $\mu m^2$ to 45 $\mu m^2$, the absolute value of a dispersion slope at the wavelength is equal to or less than 0.04 ps/nm$^2$/km, and a dispersion value at the wavelength is in a range of 5 ps/nm/km to 10 ps/nm/km.

The optical fiber described above has a refractive index profile containing one or more annular region between a center core and a cladding region, the maximum relative refractive index difference Δ1 (index difference between the maximum index of the center core and the index of the cladding) is made to be in a range of 0.55% to 0.7%, and the minimum relative refractive index difference Δ2 (index difference between the minimum index of an annular region and the index of the cladding) is made in a range of −0.7% to −0.5%.

It is desirable that the optical fiber has a refractive index profile containing one or more annular region between the center core and the cladding region and, when the outside diameter of the center core is referred to as "a" and the outside diameter of the annular core is referred to as "b", the value of b/a is in a range of 1.2 to 1.5.

Further, it is desirable that the value of "b" is in a range of 9 μm to 12 μm.

According to another aspect of the invention, the optical fiber comprises a center core, cladding and annular regions between the center core and cladding and has characteristics of $\Delta 1 \leq 0.7\%$ where Δ1 is the relative index difference between the maximum index of center core and the index of cladding at an optical signal wavelength of 1570 nm and $A_{eff} \leq 45$ μm² where $A_{eff}$ is the effective area. The optical fiber is further defined by the following characteristics;

$\Delta 1 \geq 0.55\%$ $-0.7\% \leq \Delta 2 \leq -0.5\%$ $1.2 \leq b/a \leq 1.5$ $9 \ \mu m \leq b \leq 12 \ \mu m$, where Δ2 is the relative index difference between the minimum index of annular region and the index of cladding, "a" is a diameter of the center core and "b" is the outside diameter of the annular region.

As additional characteristics, $A_{eff}$ is larger than or equal to 35 μm², and an absolute value of dispersion slope and a dispersion at a wavelength of 1570 nm are respectively less then or equal to 0.04 ps/nm²/km and in the range of 5 ps/nm/km to 10 ps/nm/km.

The present invention configures a new optical transmission system comprising an optical signal transmitter, optical signal receiver optical transmission line, pumping light source and optical multiplexer for introducing a pumping light from the source into the optical transmission line to Raman-amplify an optical signal on the optical transmission line, wherein at least part of the optical transmission line comprises the optical fiber as defined either one of the above.

In the optical transmission system, the optical transmission line comprises a first optical transmission line of optical fiber as defined in the above (e.g., the optical fiber length≦100 km) and a second optical transmission of another type of optical fiber.

DESCRIPTION OF THE REFERRED EMBODIMENTS

An embodiment of the present invention will be described with reference to the drawings.

Figure 1:
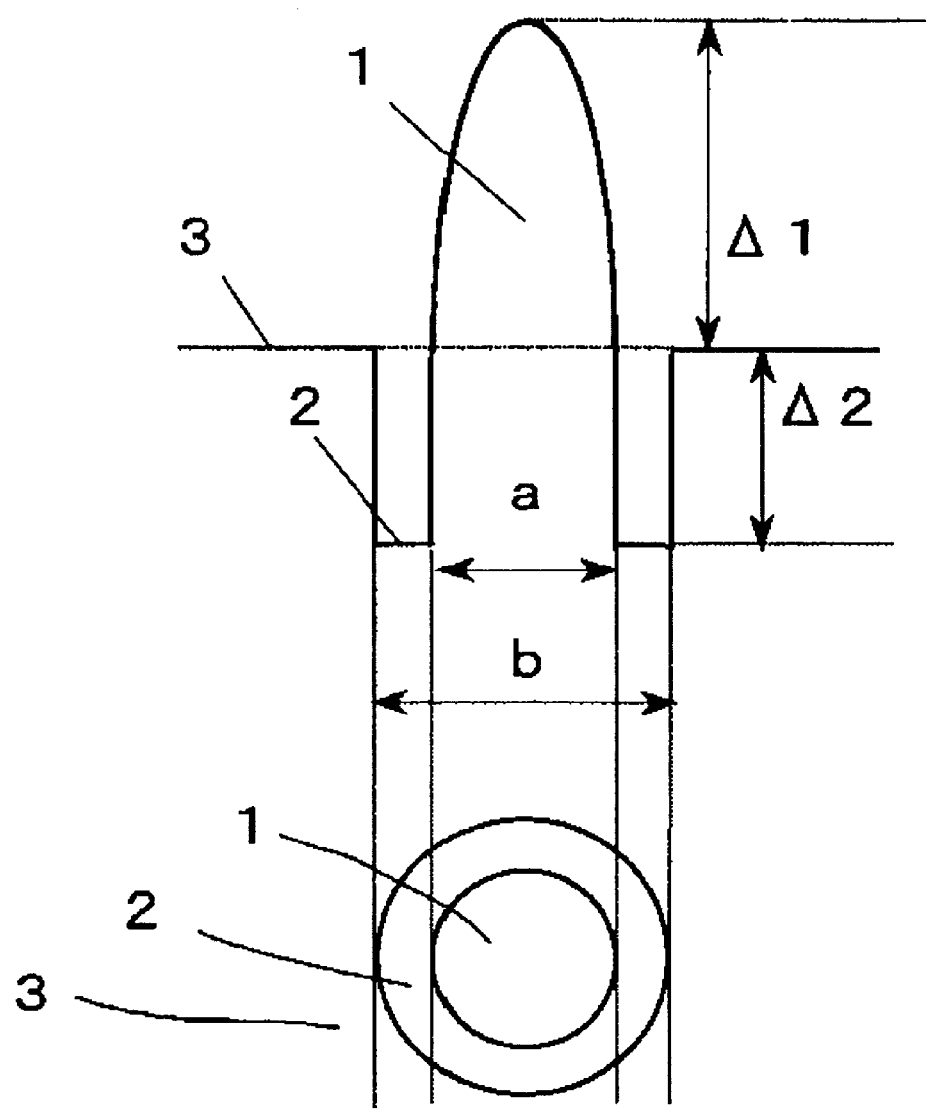
FIG. 1 is a schematic diagram of showing the refractive index profile and sectional view of one embodiment of optical fiber.

FIG. 1 is an explanatory diagram showing an example of the refractive index profile and the sectional construction of the optical fiber, as an embodiment of the present invention.

In FIG. 1, the upper portion shows the refractive index profile and the lower portion shows the sectional construction. Also, reference numeral 1 denotes a center core, 2 an annular region, and 3 a cladding region. The center core 1 has the maximum relative refractive index difference Δ1 with respect to the cladding region 3 (index difference between the maximum index $n_1$ of the center core and the index $n_c$ of the cladding region; $\Delta 1(\%) = ((n_1^2 - n_c^2)/2n_c^2 \times 100)$. Also, the annular region 2 has the minimum relative refractive index difference Δ2 with respect to the cladding region 3 (index difference between the minimum index $n_2$ of the annular core region and the index $n_c$ of the cladding region; $\Delta 2(\%) = (n_2^2 - n_c^2)/2n_c^2 \times 100)$. Here, in FIG. 1, Δ1>0, Δ2<0, and the boundary between the center core 1 and the annular region 2 is a part in which the refractive index profile curve becomes the refractive index of the cladding region 3. Note that the illustration of the periphery of the cladding region 3 is omitted in FIG. 1.

The optical fiber of the present invention is not limited to the construction shown in FIG. 1 and the scope of the present invention contains an optical fiber that satisfies conditions that an effective area at a wavelength of 1570 nm is in a range of 35 μm² to 45 μm², the absolute value of a dispersion slope at the wavelength is equal to or less than 0.04 ps/nm²/km, and a dispersion value at the wavelength is in a range of 5 ps/nm/km to 10 ps/nm/km.

Here, the above characteristics are determined at the wavelength of 1570 nm because, in this case, it becomes easy to apply the optical fiber to a dense WDM (DWDM) optical transmission system at both of C-Band and L-Band described above. In reality, if the characteristics are determined at the wavelength of 1570 nm, there is extremely increased the possibility that the optical fiber becomes an optical fiber that is useful in both of the C-band and L-band. More specifically, in order to balance the characteristics having a large wavelength dependency such as the dispersion characteristic, in the case of assuming the use in both of the C-Band or L-Band, it is desirable that the characteristics are determined at the wavelength of 1570 nm.

Considering the nonlinear phenomenon in the optical fiber and the Raman efficiency, it is desirable that the effective area at the wavelength of 1570 nm falls within a range of 35 μm² to 45 μm².

Considering chromatic dispersion difference on the wavelength region, it is desirable that the absolute value of the dispersion slope at the wavelength of 1570 nm is set so as to be equal to or less than 0.04 ps/nm²/km.

Considering FWM (Four Wave Mixing) and the cumulative dispersion, it is desirable that the dispersion value at the wavelength of 1570 nm falls within a range of 5 ps/nm/km to 10 ps/nm/km.

Additionally, it is desirable that the optical fiber of the present invention has the following constructions so that the conditions described above are satisfied.

(1) The optical fiber has a refractive index profile containing one or more annular region between the center core 1 and the cladding region 3, the maximum relative refractive index difference Δ1 (index difference between the maximum index of the center core 1 and the index of the cladding region 3) is in a range of 0.55% to 0.7%, and the minimum relative refractive index difference Δ2 (index difference between the minimum index of the annular region and the index of the cladding region 3) is in a range of −0.7% to −0.5%.

(2) The optical fiber has a refractive index profile containing one or more annular region between the center core and the cladding region and, when the outside diameter of the center core is referred to as "a" and the outside diameter of the annular core is referred to as "b", the value of b/a is in a range of 1.2 to 1.5.

(3) In the construction (2) described above, the value of "b" is in a range of 9 μm to 12 μm.

Also, where an optical fiber according to this embodiment is used for the Raman amplification, it is desirable that the zero-dispersion wavelength is not arranged within a signal light wavelength band and a pumping light wavelength band from the viewpoint of suppressing the occurrence of the FWM.

For example, where the signal light wavelength band is the C-Band and L-Band, it is desirable that the optical fiber has a dispersion value of at least 2 ps/nm/km in a wavelength band of 1430 nm to 1625 nm and it is also preferable that the zero-dispersion wavelength is arranged out of the wavelength band of 1400 nm to 1650 nm.

Also, where an optical fiber according to this embodiment is used for the Raman amplification, it is desirable that a single-mode operation is performed in the signal light wavelength band and the pumping light wavelength band. Therefore, it is preferable that the cutoff wavelength of an optical fiber according to this embodiment exists on the shorter wavelength side than the pumping light wavelength band.

For example, where the signal light wavelength band is the C-Band and L-Band, it is desirable that the cutoff wavelength exists on the shorter wavelength side than the wavelength of 1430 nm and it is more desirable that the cutoff wavelength exists on the shorter wavelength side than the wavelength of 1400 nm.

On the other hand, there is a tendency that if the cutoff wavelength is shifted to the short wavelength side too much, the bending loss of the optical fiber is increased in the signal light wavelength band and the pumping light wavelength band. Therefore, where the signal light wavelength band is the C-Band and L-Band, it is desirable that the cutoff wavelength exists on the longer wavelength side than the wavelength of 850 nm.

An embodiment of the optical fiber of the present invention has been described above. Next, there will be described an optical transmission system in which an optical fiber according to this embodiment is used.

Figure 2:
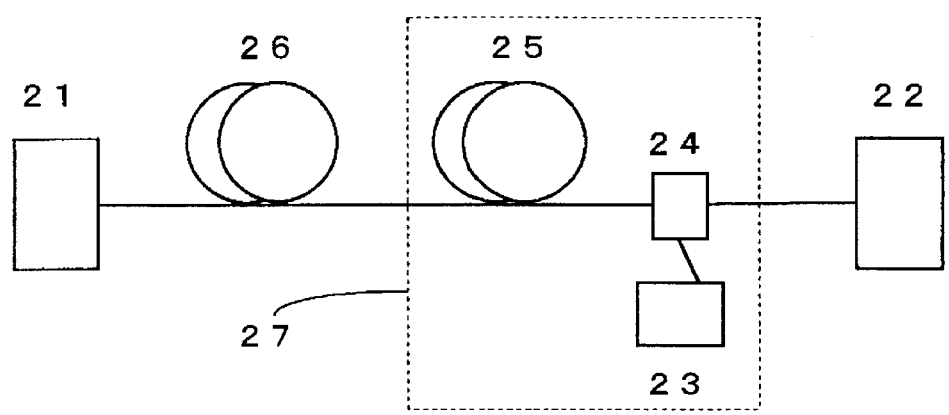
FIG. 2 is a block diagram of illustrating one embodiment of optical transmission system.

FIG. 2 is an explanatory diagram showing an example of a WDM transmission system in which an optical fiber according to the present invention is used. In FIG. 2, reference numeral 21 denotes an optical signal transmitter, numeral 22 an optical signal receiver, numeral 23 a wavelength multiplexed pumping light source, numeral 24 an optical multiplexer, and numerals 25 and 26 optical transmission lines using optical fibers. Also, an optical fiber according to the present invention is used for at least part of the optical transmission line 25. Note that it is possible to use an optical fiber according to the present invention for at least part of the optical transmission line 26 and to use a transmission optical fiber of another type for the other transmission line.

The wavelength multiplexed pumping light source 23 is constructed so as to include a plurality of pumping light sources having different wavelengths. Also, the optical multiplexer 24 is, for instance, constructed from a WDM filter such as a dichroic mirror or a WDM coupler, and realizes a function of sending pumping light from the wavelength multiplexed pumping light source 23 to the optical transmission line 25. With this construction, the Raman amplification is performed in the optical transmission line 25.

In general, a conformation, in which the Raman amplification is performed using the wavelength multiplexed pumping light source 23, the optical multiplexer 24, and the optical transmission line 25 in FIG. 2, is called a "distribution type". Also, an area 27 that is surrounded by the broken line in FIG. 2 and includes these construction elements is called the "distribution optical Raman amplifier" in some cases.

In FIG. 2, it should be noted here that the optical transmission line 25 and the optical transmission line 26 are expediently distinguished from each other. That is, illustratively, a portion in which the Raman amplification is substantially performed, is distinguished from a portion in which the Raman amplification is not substantially performed. Therefore, the optical transmission line 25 and the optical transmission line 26 may be made of the same kind of optical fibers that are the optical fiber according to the present invention. Alternatively, the optical transmission line 25 is made of the optical fiber according to the present invention and the optical transmission line 26 is made of the other kinds of optical fibers.

Here, the optical transmission line 25 in FIG. 2 directly relates to the Raman amplification, so that it is particularly required that the optical fiber used for the optical transmission line 25 has a small Rayleigh scattering coefficient and high Raman efficiency.

Also, as described in the explanation of the optical fiber according to this embodiment, it is also desirable that the zero-dispersion wavelength is not arranged in the signal light wavelength band and the pumping light wavelength band from the viewpoint of suppressing the occurrence of the FWM.

It is difficult to meet these requirements with the conventional optical fiber. However, by applying the optical fiber according to the present invention to the optical transmission line 25, it becomes possible to meet the requirements described above. Therefore, it can be understood that the optical fiber according to the present invention is suitable for the Raman amplification.

EXAMPLES OF EMBODIMENT

The present invention will be described in detail below based on specific examples.

Optical fibers of examples of embodiment according to the present invention and an optical fiber of a comparative example are shown in Table 1. Note that the unit of Δ1 and Δ2 is %, the unit of the outside diameter "b" of an annular region ("b" is cladding inside diameter for the comparative example) is μm, the unit of dispersion is ps/nm/km, the unit of the dispersion slope is ps/nm²/km, the unit of the cutoff wavelength $\lambda_c$ and the zero-dispersion wavelength $\lambda_0$ is nm, and the unit of $A_{eff}$ is μm². The values of the dispersion, dispersion slope, and $A_{eff}$ being values are obtained at the wavelength of 1570 nm.

TABLE 1

| | Δ1 | Δ2 | b/a | b | Dispersion | Dispersion slope | $\lambda_c$ | $\lambda_o$ | $A_{eff}$ |
|---|---|---|---|---|---|---|---|---|---|
| Example 1 | 0.63 | −0.65 | 1.30 | 10.30 | 8.4 | 0.026 | 971 | 1365 | 40 |
| Example 2 | 0.63 | −0.70 | 1.30 | 10.00 | 5.8 | 0.016 | 940 | 1387 | 40 |
| Example 3 | 0.63 | −0.60 | 1.30 | 10.20 | 7.6 | 0.027 | 966 | 1378 | 41 |
| Example 4 | 0.63 | −0.50 | 1.30 | 10.20 | 7.8 | 0.032 | 976 | 1388 | 42 |
| Example 5 | 0.55 | −0.65 | 1.30 | 10.60 | 7.1 | 0.017 | 928 | 1368 | 45 |
| Example 6 | 0.70 | −0.65 | 1.30 | 9.80 | 7.0 | 0.026 | 980 | 1387 | 37 |
| Example 7 | 0.63 | −0.65 | 1.50 | 11.20 | 7.5 | 0.006 | 912 | 1344 | 36 |
| Example 8 | 0.63 | −0.65 | 1.20 | 9.60 | 7.7 | 0.035 | 989 | 1394 | 43 |
| Comparative example | 0.36 | — | — | 8.00 | 18.0 | 0.055 | 1280 | 1310 | 90 |

In Table 1, all of the optical fibers of the examples 1–8 of embodiment according to the present invention satisfy the conditions that the effective area at the wavelength of 1570 nm is in the range of 35 $\mu m^2$ to 45 $\mu m^2$, the absolute value of the dispersion slope at the wavelength is equal to or less than 0.04 ps/nm²/km, and the dispersion value at the wavelength is in the range of 5 ps/nm/km to 10 ps/nm/km. These conditions are satisfied, so that the optical fibers of the examples 1–8 are suitable for the Raman amplification. In Table 1, the comparative example is an SMF.

Test of Transmission Lines

An optical transmission test was conducted for the WDM optical transmission system in FIG. 2 by using the optical fibers in Table 1 as the optical transmission line 25.

Here, in this test, the distance between the optical signal transmitter 21 and the optical signal receiver 22 was set at around 100 km, 16 waves of a light signal of 40 Gbps/ch were arranged at even intervals within a wavelength band of 1540 nm to 1564 nm (within the range of the C-band), and the signal light level in the optical signal receiver was set to be constant in each test. Also, the wavelength and power of each light source contained in the wavelength multiplexed pumping light source 33 were adjusted so that there was obtained a relatively flat gain-to-wavelength characteristic (with deviation being within a range of at least 1 dB).

As to the arrangement of light signals, the test was also conducted for a case where 16 waves of a light signal of 40 Gbps/ch were arranged at even intervals within a wavelength band of from 1580 nm to 1604 nm (within a range of the L-Band).

The types of optical fibers used for the optical transmission line 25, the pumping light power, and results of the optical transmission test in Example 1, Example 5, Example 6, and the comparative example are shown in Table 2. Note that the pumping light power is the total power and its unit is mW. As to the indication of the results of the optical transmission tests, each result where the value of BER in the optical signal receiver was not lowered to below $10^{-11}$ when a signal having the value of BER of around $10^{-12}$ was transmitted through the optical transmission system in FIG. 2 is given a mark "O" and each result where the BER value was lowered to below $10^{-11}$ when the signal was transmitted therethrough is given a mark "X".

The measurement standard for BER is defined by ITUT G. 821. In the measurement system, a pulse pattern generator sends a bit pattern through an optical transmission line to measurement apparatus for BER. The measurement apparatus checks the transmitted bit pattern by comparing it with the bit pattern stored therein to determine BER for the optical transmission line.

TABLE 2

| Fiber | Pumping light power | Result C | Result L |
|---|---|---|---|
| Example 1 | 400 | O | O |
| Example 5 | 450 | O | O |
| Example 6 | 350 | O | O |
| Comparative Example | 1600 | X | X |

It can be understood from the results in Table 2, the optical transmission system in FIG. 2 that uses the optical fibers of the examples 1, 5 and 6 according to the present invention are more suitable for the Raman amplification than a case where the optical fiber of the comparative example is used.

In the case where the optical fibers of the examples 1, 5 and 6 are compared with the optical fiber of the comparative example, $A_{eff}$ of the examples 1, 5 and 6 is smaller than that of the comparative example, so that the Raman efficiency is improved in the optical transmission system in FIG. 2.

That is, as shown in Table 2, it can be understood that the optical transmission system using the Raman amplification is preferably realized by the optical fibers of the examples 1–8 in Table 1. It can also be understood that the optical fiber cited as the comparative example is not suitable for the Raman amplification.

What is claimed is:

1. An optical fiber comprising a core and cladding and having characteristics in that:
    an effective area $A_{eff}$ at a wavelength of 1570 nm is in a range of 35 $\mu m^2$ to 45 $\mu m^2$;
    an absolute value of a dispersion slope at the wavelength is equal to or less than 0.04 ps/nm²/km; and
    a dispersion value at the wavelength is in a range of 5 ps/nm/km to 10 ps/nm/km.

2. An optical fiber according to claim 1, wherein:
    a dispersion of the optical fiber is no less than 2 ps/nm/km over a wavelength range between 1430 nm and 1625 nm;
    a zero-dispersion wavelength of the optical fiber is out of a wavelength range between 1400 nm and 1650 nm.

3. An optical fiber according to claim 2, wherein a cutoff wavelength of the optical fiber is shorter than 1430 nm.

4. An optical fiber according to claim 1, comprising at least one annular region of relative indexes between a center core and a cladding region;
    a relative index difference Δ1 of the maximum index of said center core to the index of said cladding region is in a range of 0.55% to 0.7%; and a relative index difference Δ2 of the minimum index of said annular region to the index of said cladding region is in a range of −0.7% to −0.5%.

5. An optical fiber according to claim 4, wherein when a diameter of the center core is referred to as "a" and an outside diameter of the annular region is referred to as "b", a value of b/a is in a range of 1.2 to 1.5.

6. An optical fiber according to claim 5, wherein a value of said outer diameter "b" is in a range of 9 μm to 12 μm.

7. An optical transmission system of wavelength division multiplex (WDM) comprising an optical signal transmitter, optical signal receiver, optical transmission line, pumping light source and optical multiplexer for introducing a pumping light from the source into the optical transmission line to Raman-amplify an optical signal on the optical transmission line, wherein at least part of the optical transmission line comprises one type of the optical fiber as recited in claim 1.

8. The optical transmission system of WDM according to claim 7, wherein the optical transmission line further comprises another type of optical fiber.

9. An optical transmission system of WDM according to claim 7, wherein the length of the optical transmission line is less than or equal to 100 km.

10. An optical transmission system of WDM according to claim 7, wherein the cutoff wavelength of the optical fiber is shorter than that of the pumping lights.

11. An optical fiber comprising a center core, cladding and annular region between the center core and cladding and having a relative refractive index difference Δ1 of less than or equal to 0.7% where Δ1 is the relative index difference of maximum refractive index of said center core to the refractive index of said cladding region and $A_{eff}$ less than or equal to 45 μm² at an optical signal wavelength of 1570 nm where $A_{eff}$ is the effective area, wherein the optical fiber further is defined by the following characteristics;

Δ1≧0.55%

−0.7%≦Δ2≦−0.5%

1.2≦b/a≦1.5

9 μm≦b≦12 μm, where Δ2 is the relative index difference of the minimum refractive index of said annular region to the refractive index of said cladding region, "a" is a diameter of said center core and "b" is an outside diameter of said annular region.

12. An optical fiber according to claim 11, wherein $A_{eff}$ is larger than or equal to 35 μm².

13. An optical fiber according to claim 12, wherein an absolute value of dispersion slope and a dispersion under the optical signal wavelength of 1570 nm are respectively less than or equal to 0.04 ps/nm²/km and in the range of 5 ps/nm/km to 10 ps/nm/km.

14. An optical fiber according to claim 11, wherein:

a dispersion slope of the optical fiber at a wavelength of 1570 nm is no more than 0.04 ps/nm²/km in absolute value;

and a dispersion of the optical fiber at a wavelength of 1570 nm is in the range of 5 ps/nm/km to 10 ps/nm/km.

15. An optical fiber according to claim 11, wherein a dispersion is at least 2 ps/nm/km in the wavelength range of 1430 nm to 1625 nm and a zero-dispersion wavelength is out of the wavelength range of 1400 nm to 1650 nm.

16. An optical fiber according to claim 11, wherein a cutoff wavelength of the optical fiber is shorter than 1430 nm.

17. An optical transmission system of wavelength division multiplex (WDM) comprising an optical signal transmitter, optical signal receiver, optical transmission line, pumping light source and optical multiplexer for introducing a pumping light from the source into the optical transmission line to Raman-amplify an optical signal on the optical transmission line, wherein at least part of the optical transmission line comprises one type of the optical fiber as recited in claim 11.

18. The optical transmission system of WDM according to claim 17, wherein the optical transmission line further comprises another type of optical fiber.

19. An optical transmission system of WDM according to claim 17, wherein the length of the optical transmission line is less than or equal to 100 km.

20. An optical transmission system of WDM according to claim 17, wherein the cutoff wavelength of the optical fiber is shorter than that of the pumping lights.

* * * * *